(12) United States Patent
Popp

(10) Patent No.: US 7,689,975 B2
(45) Date of Patent: Mar. 30, 2010

(54) PROCESSING OF A COMPILEABLE COMPUTER PROGRAM

(75) Inventor: Ondrej Popp, Eindhoven (NL)

(73) Assignee: NXP B.V., Eindhoven (NL)

( * ) Notice: Subject to any disclaimer, the term of this patent is extended or adjusted under 35 U.S.C. 154(b) by 1200 days.

(21) Appl. No.: 10/552,777

(22) PCT Filed: Apr. 13, 2004

(86) PCT No.: PCT/IB2004/050425

§ 371 (c)(1),
(2), (4) Date: Oct. 12, 2005

(87) PCT Pub. No.: WO2004/092953

PCT Pub. Date: Oct. 28, 2004

(65) Prior Publication Data

US 2007/0067316 A1    Mar. 22, 2007

(30) Foreign Application Priority Data

Apr. 16, 2003  (EP)  ................... 03101032

(51) Int. Cl.
*G06F 9/44* (2006.01)
*G06F 9/45* (2006.01)

(52) U.S. Cl. .............. 717/136; 717/123; 717/140; 717/145

(58) Field of Classification Search ........ 717/136, 717/140–146, 153, 123
See application file for complete search history.

(56) References Cited

U.S. PATENT DOCUMENTS

| | | | | |
|---|---|---|---|---|
| 4,916,610 A | * | 4/1990 | Bapat | .......... 717/141 |
| 5,606,697 A | | 2/1997 | Ono | |
| 5,692,196 A | * | 11/1997 | Unni et al. | .......... 717/145 |
| 5,778,212 A | | 7/1998 | Dehnert et al. | |
| 5,842,204 A | | 11/1998 | Andrews et al. | |
| 5,920,723 A | | 7/1999 | Peyton, Jr. et al. | |
| 5,923,880 A | * | 7/1999 | Rose et al. | .......... 717/145 |

(Continued)

FOREIGN PATENT DOCUMENTS

CN    1262771 A    8/2000

(Continued)

OTHER PUBLICATIONS

"Source Debug View Information Architecture" IBM Technical Disclosure Bulletin, vol. 36, No. 9B (1993), p. 307-310.

(Continued)

*Primary Examiner*—Lewis A Bullock, Jr.
*Assistant Examiner*—Himanshu Yadav

(57) ABSTRACT

A plurality of source files and one or more header files are provided. The header files that contain information that several of the source files refer to. The original files are preprocessed, each to generate a respective preprocessed file, said preprocessing comprising expanding the several of the source files with the information from a first header 5 file. A collective processing step is applied to make coordinated changes to information from the preprocessed files. The changed preprocessed files are used to regenerate modified source and header files. For regenerating the first header file, one of the preprocessed files is selected on the basis of detection that the selected file elaborates the information from the first header file. The first header file is regenerated from the information in the selected file.

17 Claims, 3 Drawing Sheets

U.S. PATENT DOCUMENTS

Figure 1:
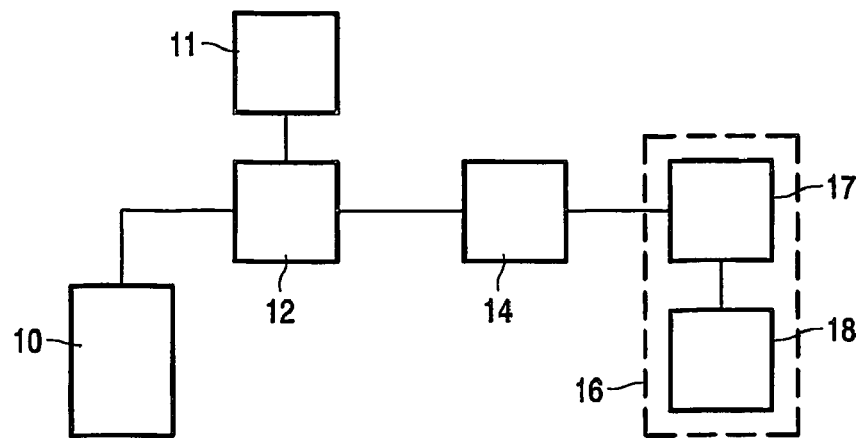

| | | | |
|---|---|---|---|
| 6,006,031 A | 12/1999 | Andrews et al. | |
| 6,286,134 B1 | 9/2001 | Click, Jr. et al. | |
| 6,816,666 B1 | 11/2004 | Kanai et al. | |
| 7,284,240 B1 * | 10/2007 | Fleegal | 717/137 |
| 2003/0005421 A1 | 1/2003 | Prakash et al. | |

FOREIGN PATENT DOCUMENTS

| | | | |
|---|---|---|---|
| CN | 1271891 A | 11/2000 | |

OTHER PUBLICATIONS

Andrews, K. et al. "Macro and File Structure Preservation Source-to-Source Translation" John Wiley & Sons., vol. 26, No. 3 (1996), pp. 281-292.

International Search Report for International Patent Appln. PCT/IB2004/050425 (Sep. 23, 2005).

* cited by examiner

PROCESSING OF A COMPILEABLE COMPUTER PROGRAM

The invention relates to processing of a compileable computer program that is composed of a plurality of files, e.g. source and header files, or more generally to processing of a compileable functional system description that is composed of a plurality of files.

The generation of large computer programs conventionally involves combining large numbers of files. To keep design manageable, modules of source code are distributed over different files that can be designed and processed separately to a certain extent C++ programming, for example, involves the use of large numbers of classes that can be distributed among multiple source files. The source files can be checked for syntax errors and compiled into object code separately of one another. The information derived from different source files is combined only at a final stage, the linking stage, to generate a machine executable computer program.

During separate processing of the source files, an element of design information may need to be available to multiple source files. In C++ programming, for example, a class definition has to be accessible to different source files either to make use of the class, or to implement the class. Header files that contain the shareable design elements are used for this purpose. Those source files that use an element of design information contain "include statements" that refer to the header file that contains the element. Header files in turn can also contain include statements.

Prior to syntax checking and compilation, each source file is preprocessed by a preprocessor that generates a preprocessed file which contains the code from the source file, but wherein the include statements are expanded by substituting information from the header files that the include statements refer to. The preprocessor does this recursively: if the header files in turn contain include statements the information referred to is expanded in the preprocessed file and so on. This could involve duplication of information from header files that are referred to more than once. A programmer normally adds conditional include statements that causes the preprocessor to suppress such duplication. The conditional include statements make inclusion of a header file conditional on the absence of previous expansion of the header file. In many cases, this suppression is even required, because otherwise duplicate definitions will be inserted that will break compilation.

The preprocessed files are used for syntax checking and object file generation. At the linking stage, the object files are combined to form an executable program. Thus, there is a strict separation into an initial separate-source file processing stage and a final collective file processing stage. In the initial stage each source file is processed separately, while in the final stage all files derived from the source files are processed collectively. No separate source file processing stage follows the collective file processing stage.

However, for various reasons it has been proposed to depart from this strict separation, by using multiple alternations between separate file processing stages and collective file processing stages. U.S. Pat. No. 5,920,723 describes a process in which a collective—source file optimization processing stage is executed prior to linking. The optimization stage combines information derived from the different source files before the linking stage, to optimize the program code. Optimization may involve modifications of instructions, movement of instructions, removal of superfluous instructions, addition of compensating instructions etc. The optimization stage generates respective optimized intermediate files, each corresponding to a respective one of the source files. After the optimization stage, the intermediate files are subjected to separate processing once more to generate object files. The object files are finally subjected to collective processing to link the object files into an executable program.

In principle the intermediate files could be expressed in the same syntax as the source files. Thus, both the source files and the intermediate files can be processed by the same compiler programs such that no separate compilers are needed. When separate processing stages alternate with collective processing stages, the problem may arise how one should split the processed information into separate files. In the case of U.S. Pat. No. 5,920,723 this problem is hardly present, because there is a one-to-one relation between source files and intermediate files. The intermediate files can be compiled separately using the original header files.

A problem arises when program restructuring beyond conventional optimization is required, for example so that header files are also modified. This type of restructuring may be required for example to redesign a program for execution on a different type of (multi)processor, for example to replace communication channels between different program elements. In this case source files and header files are preprocessed by a preprocessor. As a result of preprocessing, copies of the same information from the header files can occur in different preprocessed files. When such information from header files is changed it should first of all be ensured that information from the same header file that occurs in different preprocessed files is not changed inconsistently. Furthermore, it would be desirable to regenerate header files at the end of the collective processing stage and to reintroduce include statements that refer to the regenerated header files (the term "regenerated" files refers to files corresponding to the original files, with modifications as a result of the collective processing stage). Thus, the regenerated source and header files can be processed with the tools that are available for the original source and header files. This gives rise to the additional problem of generation of header files.

At first sight it might appear that, if the original header file can be identified in the preprocessed file, the new header file and the new include statements can be regenerated from that information, as modified. However, this is not possible because the expansion of header files during preprocessing can be incomplete due to conditional include statements. Thus a problem exists in multi-file processing when different source files are each preprocessed separately using information from common files, such as header files, subsequently modified collectively, and new source and common files have to be regenerated after modification.

Amongst others, it is an object of the invention to provide for a method and system for regenerating source files and common files from modified preprocessed files.

It is a further object of the invention to regenerate the common files from versions of the source files that contain expansions of information from the common files.

The method according to the invention is set forth in claim 1. Preprocessed files that are each generated from a respective original file (e.g. a source file) with added information expanded from one or more common files (e.g. header files), are subjected to coordinated changes. After making the changes, the preprocessed files are used to regenerate both regenerated files for the original files (e.g. regenerated source files) and for the common files (e.g. regenerated header files). Since the amount of information that has been expanded from the common files into different preprocessed files may differ, special care is needed to ensure that the generated files are sufficiently complete. Therefore a preprocessed file that is expected to contain sufficiently complete header file information is selected to regenerate the common file, or at least to be used for that part of the regeneration that determines completeness. The preprocessed files that are selected for regeneration of the common files are selected on the basis of the type of reference that the original files make to the header files. Preprocessed files that contain an implementation of software components defined in common files are used to generate the header files. After generation of source and header files, the files may be processed separately, for example by compiling them into object files, and subsequently linked, for example to generate an executable program. A computer may subsequently execute the instructions of such an executable program.

As mentioned above, the preprocessed files are preferably selected for the regeneration of a common file on the basis of detection of implementations of software components that have been declared in that common file. Preferably, the selecting is done prior to coordinated collective processing so that for a common file only information from the selected preprocessed file needs to be retained in computer memory for coordinate processing. Preferably, a two-pass process is used. The first pass determines which preprocessed file should be used for which common file. The second pass obtains the common file information from the selected preprocessed files. The first pass determines the order of reading of the preprocessed files, so that a position of a particular preprocessed file in said order is selected so that, if that particular preprocessed file contains an implementation of a software component that refers to one or more further software components, the particular preprocessed file is positioned in said order for reading after a reprocessed file or files that contain implementations of all of the one or more further software component In other words, reading is performed in a bottom up manner, so that first files are read that define the lowest components in the reference hierarchy of the software components (a first component is said to be higher in the hierarchy if the definition of the first component refers to the second component). Thus only the first encountered expansion of a common file needs to be retained. Preferably, marking information is included in the preprocessed files to identify both the common file from which information has been expanded into the preprocessed files and the information itself that has been expanded. During regeneration, the marking information is used to insert instructions instead of the expanded information that is in the regenerated files for the original files. The insert instructions command inclusion of the regenerated file for the first one of the common files where the first one of the common files was expanded into the preprocessed files. The regenerated file for the common file is regenerated from expanded information marked by the marking information in the selected preprocessed file. Thus, the regenerated files can be used in the same way as the original files.

Preferably information that several of the original files refer to is a definition of a structure of a software component, the selected file elaborating the information by providing an implementing program for an element of the software component. In this case, it is preferably detected for each preprocessed file whether that one of the original files from which the selected preprocessed file was generated contained, preceding a first instruction for expanding the information from the first one of the common files, a preceding instruction for expanding information from a further common file, and an equivalent copy of the preceding instruction is generated in each regenerated file where an instruction for expanding the first one of the common files is inserted, the equivalent copy being inserted preceding the instruction for expanding the first one of the common files.

These and other objects and advantageous aspects of the invention will be described using the following figures.

Figure 3:
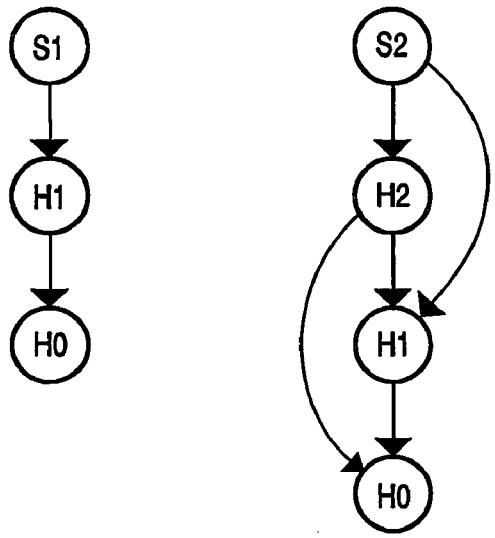
Figure 4:
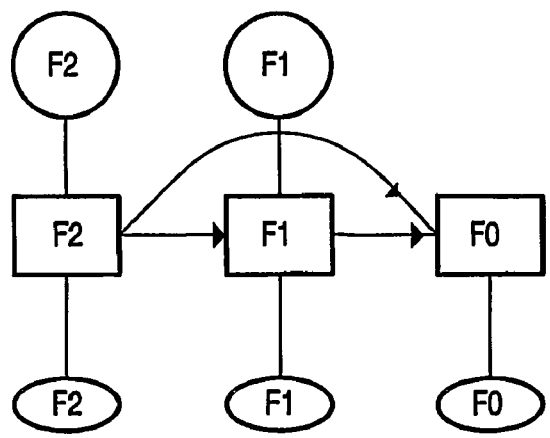
Figure 2:
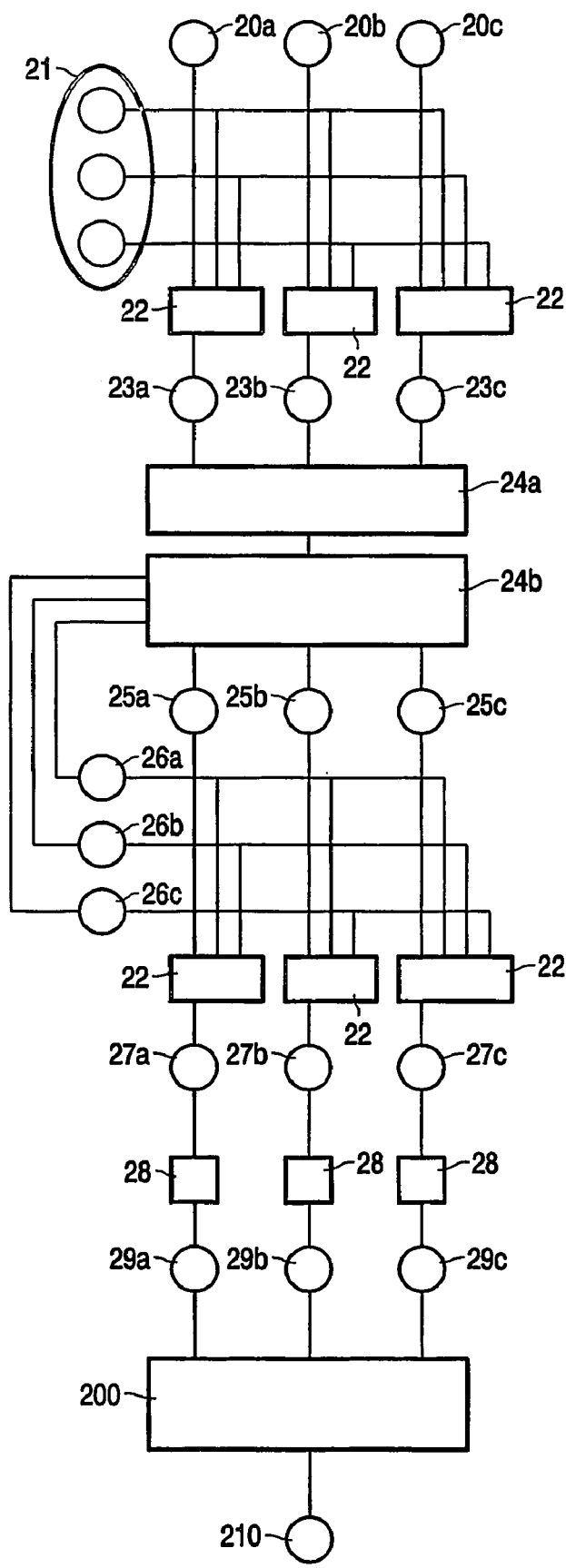
Figure 5:
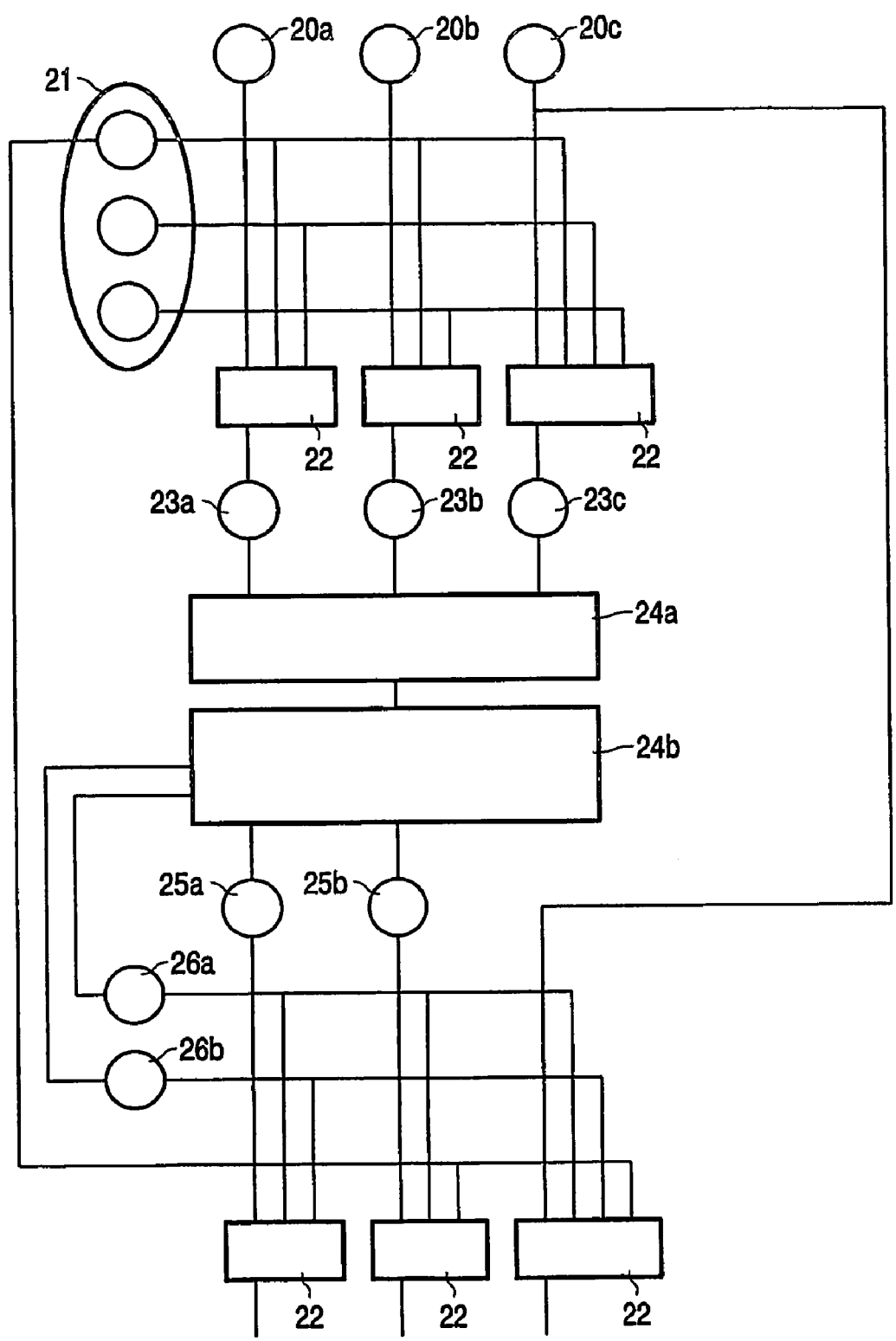

FIG. 1 shows a system for processing program files
FIG. 2 shows an information processing structure
FIG. 3 shows reference relations between files
FIG. 4 shows a representation of a data structure
FIG. 5 shows an information processing structure FIG. 1 shows a system for processing files. The system contains a storage device 10, such as a magnetic disk or a combination of such disks, for storing source and header files, a processor 12, a processor memory 11, a target computer 16 with a target program memory 17 and a target processor 18 and a device 14 for storing generated programs of machine instructions into program memory 17. Without deviating from the invention, target processor 18 may be processor 12, target program memory 17 being processor memory 11.

Processor 12 is coupled to storage device 10 for reading original source files and original header files from storage device 10 and to processor memory 11. Device 14 is coupled between processor 12 and target program memory 17. Device 14 may be arranged to write a program of machine instructions into target program memory 17, or, when target computer is part of an integrated circuit, to manufacture program memory 17 programmed with the program. It will be understood however, that the coupling between processor 12 and device 14 may in fact be realized via storage device 10 or any a storage device (not shown).

FIG. 2 shows information flow during processing. Original source files 20a-c, which are stored in storage device 10 are applied to preprocessors 22. By way of example three original source files 20a-c are shown, but it will be understood that any number of original source files 20a-c may be used. Preprocessors 22 are implemented for example as a program running on computer 12 that is executed repeatedly, each time for a respective original source file 20a-c. Preprocessors 22 use files from a group of original header files 21 during preprocessing and produces preprocessed files 23a-c, each for a respective one of original source files 20a-c.

Preprocessors typically copy instruction code from original source files 20a-c into respective ones of preprocessed files 23a-c and insert information from original header files 21 into the preprocessed files 23a-c in response to certain statements from original source files 20a-c. The inserted information is marked to indicate the original header file 21 from which the information was derived. The preprocessed files 23a-c that are produced by preprocessors 22 are stored, for example in processor memory, or in storage device 10.

Table 1 shows an example of an original source file, a original header file and a preprocessed file, wherein an include statement has been used to expand the original source file with information from the original header file and in which marking information has been added. In addition, at the top of the preprocessed file, a mark to identify the source file has been added.

TABLE 1

| source file 20a-c | header file 21 | preprocessed file 23a-c |
|---|---|---|
| #include "header file" | definition line 1 | Mark "source file" |
| program line 1 | definition line 2 | Mark "header file" |
| program line 2 | etc. | definition line 1 |
| etc. | | definition line 2 |
| | | etc. |

TABLE 1-continued

| source file 20a-c | header file 21 | preprocessed file 23a-c |
|---|---|---|
| | | EndMark |
| | | program line 1 |
| | | program line 2 |
| | | etc. |

It will be appreciated that the form of marking is shown merely by way of example: any convenient form of marking information as originating from an identified original header file may be used.

The original header file may contain include statements to further original header files. In this case preprocessor 22 expands information from these further original header files into preprocessed file 23a-c and adds corresponding marking information into preprocessed files 23a-c. When these further original header files in turn contain include statements information from yet further original header files is included in preprocessed file 23a-c and so on.

Original header files 21 may contain conditional statements, for example "#ifndef X" to cause preprocessor 22 to skip expansion of part of the original header file 21 if a variable X has been previously defined. For example, suppose an original header file 21 contains the following statements

```
...
#endif
```

The name of variable X is particular to this original header file. In this case the part of original header file between "ifndef" and "endif" is not expanded into preprocessed file 23a-c when an include statement to the original header file 21 is encountered when the variable X has been previously defined.

A collective processing stage 24a processes a combination of the preprocessed files 23a-c. Collective processing stage 24a is implemented for example as a program running on computer 12. Collective processing stage 24a modifies information from preprocessed files 23a-c. This may include information derived from original source files 20a-c and/or information derived from original header files 21.

The invention does not depend on the type of modification that collective processing stage 24a applies to the information from preprocessed files 23a-c. A typical modification is joint redesign of the preprocessed files, involving a change to common class definitions from original header files and corresponding modifications of instructions from original source files 20a-c that implement members of the modified class or make use of the class definition. This may be applied for example to make programs from original source files 20a-c suitable for execution on another type of target computer 16 than the one for which they were originally designed, for example by inserting instructions for data transfer between parallel processors.

A separator stage 24b splits the result of collective processing stage 24a into generated source files 25a-c and generated header files 26a-c. Generated source files 25a-c and generated header files 26a-c may be used as if they were original source files 20a-c and original header files 21 respectively. That is, they may be applied to preprocessors 22, to produce further preprocessed files 27a-c.

The further preprocessed files 27a-c may be applied to compilers 28. Compilers 28 are implemented for example as a program running on computer 12 that is executed repeatedly, each time for a respective further preprocessed file 27a-c. Compilers 28 produce object files 29a-c, which are used by a linker 200 to produce an executable program 210 of machine instructions for target processor 18. Linker may be implemented for example as a program running on computer 12.

Separator stage 24b executes generation of source files 25a-c by using code derived from preprocessed files 23a-c after modification. At those positions in the code that correspond to the position of top level marker information in the preprocessed files separator stage 24b inserts include statements in the generated source files 25a-c, where the include statements refer to the generated versions of the header files 21 identified in the marker information. Separator stage 24b does not insert expanded information from header files 21, which is marked as such by the marker information, in the generated source file 25a-c. Nor does separator stage 24b use nested marker information within the expanded information to insert include statements. Thus only top level marker information (not part of other marked information) is used to insert include statements. Table 2 illustrates regeneration of source files.

TABLE 2

| Preprocessed file 23a-c | generated source file 25a-c |
|---|---|
| Mark "source file" | #include "header file 1" |
| Mark "header file 1" | program line 1 |
| Mark "header file 2" | program line 2 |
| Definition line 1 | |
| Definition line 2 | |
| etc. | |
| end Mark 2 | |
| definition line 3 | |
| end Mark1 | |
| program line 1 | |
| program line 2 | |
| etc. | |

Separator stage 24b also generates header files 26a-c from information in preprocessed files 23a-c. In general, different preprocessed files 23a-c may each contain expansions from the same header file 21. Nevertheless, the expansions in different preprocessed files 23a-c may differ, due to the effect that preprocessors 22 give to conditional include statements. This means that only part of preprocessed files 23a-c are suitable for generating header files 26a-c. Other preprocessed files 23a-c are insufficiently complete.

FIG. 3 illustrates an incompleteness of preprocessed files 23a-c. In a first source file S1 an include statement that refers to a first header file H1 is included. First header file H1 contains an include statement that refers to a basic header file H0. A second source file S2 contains an include statement that refers to the first header file H1, preceded by an include statement that refers to a second header file H2. Second header file H1 also contains an include statement that refers to basic header file H0. Now when first source file S1 is preprocessed, first header file H1 is completely expanded including expansion of H0. However when second source file S2 is preprocessed, first header file H1 is not completely expanded, because the reference to H0 is not expanded since it has previously been expanded during expansion of second header file H2. As a result generation of a header file H1' from the preprocessed file derived from the second source file S2 would not result in a sufficiently complete generated header file H1'.

The selection of an appropriate preprocessed file for generating header files 26a-c involves an analysis of the presence of software components in preprocessed files 23a-c. For the analysis a data structure derived from preprocessed files 23a-c is used. This data structure uses identifications of software components, preprocessed files 23a-d and header files identified in preprocessed files 23a-d as entities. In one example a software component is a C++ class definition. The data structure expresses the relation of "defined_in" between identifiers of software components and header files and the relation of "implemented_in" between identifiers of software components and preprocessed files 23a-d.

Generation of header files will be illustrated using an example of source files Main, F1, F2 shown in table 3.

TABLE 3

| source files | | |
|---|---|---|
| source Main | source F1 | source F2 |
| #include "header F1" | #include "header F1" | #include "header sys" |
| #include "header F2" | program lines | #include "header F2" |
| program lines | | program lines |

The source files include header files F1, F2 and sys. By way of example it is assumed that header file F1 contains include statements for a library header file L and a header file F0 (no source files are provided for sys, L and F0). It is assumed furthermore that header file F2 contains include statements for header files L F0 and F1. Header file F0 contains include statements of header files L and sys. Header file L contains an include statement for header file sys.

This results in preprocessed files 23a-c according to table 4.

TABLE 4

| preprocessed files | | |
|---|---|---|
| Preprocessed Main | preprocessed F1 | preprocessed F2 |
| Mark "source Main" | Mark „source F1" | Mark „source F2" |
| Mark "header F1" | Mark "header F1" | Mark "header sys" |
| Mark "header L" | Mark "header L" | end Mark |
| Mark "header sys" | Mark "header sys" | Mark "header F2" |
| end Mark | end Mark | Mark "header L" |
| end Mark | end Mark | Mark "header sys" |
| Mark "header F0" | Mark "header F0" | end Mark |
| end Mark | end Mark | end Mark |
| end Mark | end Mark | Mark "header F0" |
| Mark "header F2" | program lines | end Mark |
| end Mark | | Mark "header F1" |
| program lines | | end Mark |
| | | end Mark |
| | | program lines |

It will be noted that the preprocessed files contain nested Mark information (a first Mark is followed by a second Mark before the end corresponding to the first Mark). It will also be noted that the expansion of the same header file (say F1) is different in different preprocessed files, because in some instances nested header files are not preprocessed when they have been preprocessed earlier.

Collective processing stage 24a or separator stage 24b build a data structure using information read from the preprocessed files. The files themselves define identifiers of preprocessed files. Each time mark information mentions a new header file a header file identifier is added. Software components are detected by parsing the preprocessed files, e.g. to detect class definitions. When such a class definition is encountered in a preprocessed file a software component identification is generated for it and a defined_in relation is added to the header file in which the definition was marked to occur. Similarly, the preprocessed files are parsed for implementations e.g. of member functions of classes and implemented_in relations are added each time when an implementation of a member of a class is detected in a preprocessed file and no corresponding implemented_in relation has yet been recorded. The identifications and the relations between these identifications may be recorded in any convenient way, for example by means of tables of entities like header files, preprocessed files and software components, and tables for each relation with entries for pairs of such entities that are related.

Separator stage 24b generates the header files 26a-c with information from the data structure. For each software component separator stage 24b determines the header file that is in defined_in relation to the software component and a preprocessed file that is in implemented_in relation with the software component. Subsequently the header file is generated from a preprocessed file that is in the implemented_in relation.

This process assumes that the source files 20a-c that contain an implementation of a software component that is defined in a particular header file 21 contains an include statement for that particular header file in such a way that the include statement is expanded completely. This is guaranteed to be the case for example if the include statement for the particular header file is the first include statement in the program file (any other header files needed for the particular header file being included in the particular header file itself). When program files are developed using a design style that satisfies this requirement no further measures are needed (in this case the refers_to relation is not needed).

If such a style is not prescribed, an embodiment of separator stage 24b is preferably arranged to extract from the marking information those marked top level include statements that precede the include statement for the particular header file in the preprocessed file that is used to generate the particular header file. Separator stage 24b inserts the extracted include statements in each generated source file that contains an include statement for the particular header file, preceding that header file. Thus, the same environment is created each time when the particular header file is included. Table 5 shows an example of the result of this technique

TABLE 5

| insertion of additional copies of include statements | | | |
|---|---|---|---|
| source b | header c | generated source b | generated header c |
| #include "a" | #include "b.h" | #include "a" | #include "a" |
| #include "b.h" | definition of | #include "b1.h" | #include "b1.h" |
| implementation | class c | implementation | definition of |
| of class b | | of class b | class c |

In this example, an include statement referring to file "a" occurs in source file b before the include statement for header file "b.h". Header file c contains an include statement to header file "b.h" but no include statement to file "a". The include statement for file a causes separator stage 24b to insert include statements to "a" both in the generated source for "b" and in the generated header file "c" prior to the include statement for the generated header file "b1.h". That is, an additional include statement is generated in header file "c". In principle separator stage 24b inserts such an additional include in every file where an include statement for generated header file "b1.h" is inserted. Optionally, separator stage 24*b* may suppress insertion of the additional include statement when in those files where the include statement for file "a" is already present.

In another embodiment, collective processing stage 24*a* is arranged to skip parts of preprocessed files 23*a-c* when the marker information indicates that these parts result from include statements for header files that have already been read as part of another preprocessor file 23*a-c*. By skipping it is meant that the skipped part is not modified and/or not used for collective processing. In general memory space (if any) taken up by the skipped parts in memory 11 during collective processing is reused so that no copy of those parts, or information derived from those parts is kept in memory 11 during processing. When collective processing stage 24*a* reads a preprocessed file 23*a-c* and encounters marker information, collective processing stage 24*a* determines the header file identified in the marker information, compares the header identifications with a list of header file identifications that have already been encountered in marker information and skips when the identification has already been encountered.

In one embodiment collective processing stage contain a first parser and a second parser (implemented for example as different program parts). Parsers are known per se and serve for reading preprocessed files, determining a syntactic structure of those files and extracting information according to syntactic position. The first parser is arranged to parse using a detailed grammar, which analysis details of the information between the start and the end of the marked information. The second parser is arranged to parse a less detailed grammar that treats all the information between the start and the end of the marked information as an unstructured block that is discarded.

When collective processing stage 24*a* uses such an embodiment that skips repetitions of information from a header file, it should be ensured that the first encountered information from each header file is complete. This is needed to ensure that the generated header file is complete. For this purpose the sequence of processing preprocessed files with collective processing stage 24*a* is preferably arranged so that each preprocessed file that is to be used to generate a header file (as set forth in the preceding) is processed before any other preprocessed files that include the header file.

Preferably, a reordering stage is used in collective processing stage 24*a* The reordering stage first reads preprocessed files 23*a-c* in any order and selects the order of processing the preprocessed files. Subsequently collective processing stage 24*a* reads the preprocessed files a second time in the selected order. For the purpose of reordering information about an additional "refers_to" relation between software components is preferably gathered. A first software component is said to refer to a second software component if it uses that second component (e.g. if the first component is a first class that contains variables of a second class defined by the second component).

FIG. 4 shows an example of entities and relations in a data structure derived from the preprocessed files for the example of tables 3 and 4. It is assumed that three software components F2, F1 and F0 are defined (shown as rectangular boxes). Arrows between the software components show refers_to relations. Preprocessed files F1 and F2 are shown as circles, with links to the software components of which these preprocessed files contain implementations. Marked header files are shown as ellipses, with links to the software components of which the header files contain definitions. Only preprocessed files and header files that are linked to software components F2, F1 and F1 are shown. Thus, preprocessed file Main is not shown for example.

The reordering stage builds a data structure as described with respect to FIG. 4. In order to determine a usable order of source files the reordering stage effectively uses an ordered list indicative of software components. Initially the list is empty. The reordering stage iteratively searches for a "free" software component that is not yet in the list and is not referred to by any other software component that is not yet in the lists The reordering stage appends the free software component to the list and iteratively repeats the search for a next free software component until all software components have been entered in the list. For each software component an associated preprocessed file 23*a-d* is identified that is said to be associated if it is in implemented_in relation with that software component.

When collective processing stage 24*a* reads the preprocessed files 23*a-c* for the second time the preprocessed files 23*a-c* are read in the order of the associated software components in the list. Preprocessed files that are not selected as associated with a software component but implement a particular software component may be read at any time but not before any preprocessed file that implements a further software component that the particular software component refers to.

For the example of FIG. 4 for example, in the reordered sequence common processing stage 24*a* reads the preprocessed file for original file F2 first, followed by the preprocessed file for original file F1. Other files, such as main, that are found not to implement any specific component are read subsequently.

Preferably, as described, any preceding include statement (e.g. to F0) that precedes original include statements to files of which generated versions are made (e.g. F1 and F2) is automatically copied to all generated files where include statements corresponding to the original include statements (e.g. to F1 and F2 occur).

As an alternative, or additionally, collective source processing stage 24*a* may generate auxiliary dummy implementing source files for those software components (e.g. F0) for which no implementing preprocessed file was found. The dummy implementing source file is applied to preprocessor 22 and the resulting preprocessed file is used in the second pass when the collective source processing stage reads the preprocessed files in the selected order. The dummy implementing source file (e.g. a source file for F0) merely contains an include statement for the header file that defines the software component concerned. The position of the dummy implementing source file in the sequence of reading during the second pass through by collective processing stage 24*b* is determined as for any generated source file. Thus, it is ensured that a complete expansion of the header file concerned is read from the preprocessed files when the header file is read for the first time during the second pass.

Although it is preferred that collective processing stage 24*a* applies a two pass reading process each time, with a first pass to select an order of reading for the second pass, it will be understood that the selected order may be reused a number of times for different second passes without reordering. This may be realized for example by generating a make file which describes the selected order of reading for a next run of common processing stage 24*a*, for example a run that is applied after source files 20*a-c* have changed.

Furthermore, it should be appreciated that reordering of the order of reading the preprocessed files and retaining only the first encountered expansion of a header file is a preferred embodiment, but that alternative possibilities exist for selecting the expansion to be retained. For example, amended preprocessed files might be generated, with directive information for expanded information from header files to specify whether the expanded information should be retained or not. Subsequently the amended preprocessed files are read in the next run of collective processing stage 24a and only the directed information from header files is retained in memory 11. As another example, identification about the selected preprocessed files of header files may be retained in collective processing stage 24a between the two runs, so that in the second run only information from header files from identified preprocessed files is retained in memory 11.

Furthermore, it will be appreciated that the data structure used for selecting the order of reading may be used for other purposes than reordering. In fact, the relevant data structure may be a by-product of processing by collective processing stage 24a.

Although the present invention has been described in terms of C++ source and header files, it will be appreciated that the invention may be applied to any process wherein a plurality of original files, such as source files, is preprocessed so that information from common files, such as header files, is expanded into the preprocessed files and wherein versions of the original files and the common files are generated from the preprocessed files.

FIG. 5 shows information flow where not all files are generated for reuse. By way of example one of the source files 20c is shown to be used instead of generated file 25c (not shown) and one of the header files 21 is shown to be used instead of generated header file 26c (not shown). Selection of the header files may be made on the basis of instructions supplied to collective processing stage 24a. An instruction may identify for example certain classes, whose use has to be amended from that in preprocessed files 23a-c. In this case, collective processing stage 24a uses the refers_to relations to determine which of the software components are affected by an amendment (is amended itself or refers to an affected component directly or indirectly) and commands separator stage 24b to generate source files 25a,b and header files 26a,b only for the affected files. Include statements are generated with references to (copies of) unaffected header files when no new version of the header file is generated.

As has been described the invention is primarily useful in combination with a collective processing stage 24a that automatically makes coordinated amendments to a plurality of preprocessed files, but it should be appreciated that the invention may be applied to the case where collective processing stage permits human editing of the preprocessed files.

The invention claimed is:

1. A machine executed method of processing files, the method comprising
providing a plurality of original files;
providing one or more common files, that contain information that several of the original files refer to;
preprocessing the original files each to generate a respective preprocessed file, said preprocessing comprising expanding the several of the original files with the information from a first one of the common files;
applying a collective processing step to make coordinated changes to information from the preprocessed files;
selecting one of the preprocessed files, on the basis of detection that the selected file elaborates the information from the first one of the common files, and
regenerating regenerated files for the original files and the first one of the common files as affected by the collective processing step, said regenerating of the regenerated file for the first one of the common files being controlled using information from the selected preprocessed file, so that information in the selected preprocessed file controls how much will be included in the regenerated file for the first one of the common files.

2. A machine executed method of processing files according to claim 1, comprising first separate processing of the regenerated files for the original files using information from the regenerated file for the first one of the common files followed by linking of a program of machine instructions by linking information derived from the regenerated files for the original files.

3. A machine executed method of processing files according to claim 2, comprising selectively regenerating regenerated files only for those original files and common files that are affected by said collective processing and using unaffected original files and common files in said separated processing.

4. A machine executed method of processing files according to claim 1, wherein the information that the several of the original files refer to is a definition of a structure of a software component, the selected file elaborating the information by providing an implementing program for an element of the software component.

5. A machine executed method of processing files according to claim 1, comprising the steps of
first reading the preprocessed files to perform said selecting;
second reading the preprocessed files, wherein of expanded information of the first one of the common files only expanded information from the selected preprocessed file is retained in a computer memory for use during application of collective processing.

6. A machine executed method of processing files according to claim 5, wherein said selecting comprises
detecting implementations of software components in the preprocessed files;
selecting a particular preprocessed file for retaining information from the first common file in the memory, if that particular preprocessed file contains an implementation of a software component.

7. A machine executed method of processing files according to claim 6, wherein an order of reading the preprocessed files during said second reading is preselected upon said first reading, a position of a particular preprocessed file in said order being selected so that, if that particular preprocessed file contains an implementation of a software component that refers to one or more further software components, the particular preprocessed file is positioned in said order for reading after a preprocessed file or files that contain implementations of all of the one or more further software component.

8. A machine executed method of processing files according to claim 7, comprising generating dummy files, each for a respective software component for which no implementing preprocessed file was found and reading the dummy file as part of said second reading, said generating the dummy files comprising inserting in each particular dummy file an instruction to include the common file that defines the software component for which the dummy file is generated and preprocessing the dummy files, or, instead of said inserting and preprocessing, inserting an expansion of the common file in the dummy file.

9. A machine executed method of processing files according to claim 1, said preprocessing comprising
including marking information in the preprocessed files to identify the first one of the common files from which information has been expanded into the preprocessed
files and the information that has been expanded, said regenerating comprising using the marking information to insert instructions instead of the expanded information in the regenerated files for the original files, the instructions commanding inclusion of the regenerated file for the first one of the common files where the first one of the common files was expanded into the preprocessed files, the regenerated file for the first one of the common files being regenerated from expanded information marked by the marking information in the selected preprocessed file.

10. A machine executed method of processing files according to claim 9, wherein the information that the several of the original files refer to is a definition of a structure of a software component, the selected file elaborating the information by providing an implementing program for an element of the software component, the method comprising detecting for each preprocessed file whether that one of the original files from which the selected preprocessed file was generated contained, preceding a first instruction for expanding the information from the first one of the common files, a preceding instruction for expanding information from a further common file, and generating an equivalent copy of the preceding instruction in each regenerated file where an instruction for expanding the first one of the common files is inserted, the equivalent copy being inserted preceding the instruction for expanding the first one of the common files.

11. A storage device containing machine instructions for executing the method according to claim 1.

12. A machine programmed for processing files, the machine comprising a storage system for storing a plurality of original files and one or more common files that contain information that several of the original files refer to and a processing system programmed to preprocess the original files each to generate a respective preprocessed file, said preprocessing comprising expanding the several of the original files with the information from a first one of the common files;

apply a collective processing step to make coordinated changes to information from the preprocessed files;

select one of the preprocessed files, on the basis of detection that the selected file elaborates the information from the first one of the common files, and regenerate regenerated files for the original files and the first one of the common files as affected by the collective processing step, said regenerating of the regenerated file for the first one of the common files being controlled using information from the selected preprocessed file, so that information in the selected preprocessed file controls how much will be included in the regenerated file for the first one of the common files.

13. A machine according to claim 12, comprising a memory for storing information from the preprocessed files for applying the collective processing step, the machine being arranged to first read the preprocessed files to perform said selecting;

subsequently read the preprocessed files for the collective processing step, wherein of expanded information of the first one of the common files only expanded information from the selected preprocessed file is retained in the memory for use during application of collective processing.

14. A machine according to claim 13, wherein said selecting comprises detecting implementations of software components in the preprocessed files;

selecting a particular preprocessed file for retaining information from the first common file in the memory, if that particular preprocessed file contains an implementation of a software component.

15. A machine according to claim 14, wherein an order of reading the preprocessed files during said second reading is preselected upon said first reading, a position of a particular preprocessed file in said order being selected so that, if that particular preprocessed file contains an implementation of a software component that refers to one or more further software components, the particular preprocessed file is positioned in said order for reading after a preprocessed file or files that contain implementations of all of the one or more further software component.

16. A machine according to claim 12, wherein preprocessing comprises including marking information in the preprocessed files to identify the first one of the common files from which information has been expanded into the preprocessed files and the information that has been expanded, said regenerating comprising using the marking information to insert instructions instead of the expanded information in the regenerated files for the original files, the instructions commanding inclusion of the regenerated file for the first one of the common files where the first one of the common files was expanded into the preprocessed files, the regenerated file for the first one of the common files being regenerated from expanded information marked by the marking information in the selected preprocessed file.

17. A machine according to claim 16, wherein the information that the several of the original files refer to is a definition of a structure of a software component, the selected file elaborating the information by providing an implementing program for an element of the software component, the processing system being arranged to detect for each preprocessed file whether that one of the original files from which the selected preprocessed file was generated contained, preceding a first instruction for expanding the information from the first one of the common files, a preceding instruction for expanding information from a further common file, and generate an equivalent copy of the preceding instruction in each regenerated file where an instruction for expanding the first one of the common files is inserted, the equivalent copy being inserted preceding the instruction for expanding the first one of the common files.

* * * * *